(12) United States Patent
Garner et al.

(10) Patent No.: US 10,820,032 B2
(45) Date of Patent: Oct. 27, 2020

(54) DETECTION OF A MOBILE DEVICE TO IDENTIFY USER PREFERENCES AND PROVIDE CUSTOMIZED FUNCTIONALITY OR CONTENT

(71) Applicant: Roku, Inc., Saratoga, CA (US)

(72) Inventors: Gregory M. Garner, Saratoga, CA (US); Joseph Hollinger, Saratoga, CA (US)

(73) Assignee: ROKU, INC., Los Gatos, CA (US)

( * ) Notice: Subject to any disclaimer, the term of this patent is extended or adjusted under 35 U.S.C. 154(b) by 241 days.

(21) Appl. No.: 14/958,283

(22) Filed: Dec. 3, 2015

(65) Prior Publication Data
US 2017/0034560 A1 Feb. 2, 2017

Related U.S. Application Data

(63) Continuation of application No. 14/813,703, filed on Jul. 30, 2015, now Pat. No. 10,623,796.

(51) Int. Cl.
*H04N 21/442* (2011.01)
*H04N 21/41* (2011.01)
(Continued)

(52) U.S. Cl.
CPC ... *H04N 21/4126* (2013.01); *H04N 21/25891* (2013.01); *H04N 21/42203* (2013.01);
(Continued)

(58) Field of Classification Search
CPC . H04W 4/02; H04N 21/4126; H04N 21/4583; H04N 21/44218; H04N 21/441;
(Continued)

(56) References Cited

U.S. PATENT DOCUMENTS

| 6,922,843 B1 * | 7/2005 | Herrington | H04N 7/163 348/E7.061 |
| 7,134,130 B1 * | 11/2006 | Thomas | H04N 7/163 725/25 |

(Continued)

FOREIGN PATENT DOCUMENTS

WO WO-2017/019691 A1 2/2017

OTHER PUBLICATIONS

U.S. Appl. No. 14/813,766, filed Jul. 30, 2015, entitled "Mobile Device Based Control Device Locator".
(Continued)

*Primary Examiner* — Junior O Mendoza
(74) *Attorney, Agent, or Firm* — Sterne, Kessler, Goldstein & Fox P.L.L.C.

(57) ABSTRACT

Disclosed herein are system, method, and computer program product embodiments for the detection of a mobile device to identify user preferences. An embodiment operates by detecting that a mobile device is within a vicinity of a computing device. A user ID that corresponds to the mobile device is identified. The user ID is provided to an application over a network, wherein the application identifies one or more preferences associated with the user ID. The one or more identified preferences are received from the application. The computing device is configured based on the one or more identified preferences associated with on the user ID, responsive to the detection.

20 Claims, 7 Drawing Sheets

(51) Int. Cl.
*H04N 21/4363* (2011.01)
*H04N 21/454* (2011.01)
*H04N 21/458* (2011.01)
*H04N 21/441* (2011.01)
*H04N 21/422* (2011.01)
*H04N 21/258* (2011.01)
*H04N 21/45* (2011.01)

(52) U.S. Cl.
CPC ..... *H04N 21/43637* (2013.01); *H04N 21/441* (2013.01); *H04N 21/44218* (2013.01); *H04N 21/44227* (2013.01); *H04N 21/4532* (2013.01); *H04N 21/4542* (2013.01); *H04N 21/4583* (2013.01)

(58) Field of Classification Search
CPC ....... H04N 21/42203; H04N 21/44227; H04N 21/25891; H04N 21/4532; H04N 21/43637; H04N 21/4542; H04N 5/91
USPC .......... 725/28; 455/456.1; 386/296; 715/745
See application file for complete search history.

(56) References Cited

U.S. PATENT DOCUMENTS

| | | |
|---|---|---|
| 2004/0048571 A1 | 3/2004 | Kiyose |
| 2007/0124785 A1* | 5/2007 | Marsico .............. H04L 63/102 725/105 |
| 2007/0209009 A1* | 9/2007 | Huang .................. H04N 17/04 715/745 |
| 2008/0060007 A1 | 3/2008 | Matsubayashi et al. |
| 2008/0304361 A1 | 12/2008 | Peng et al. |
| 2009/0133051 A1* | 5/2009 | Hildreth ............. H04N 21/4223 725/28 |
| 2009/0138805 A1* | 5/2009 | Hildreth ............. G06K 9/00335 715/745 |
| 2009/0158162 A1 | 6/2009 | Imai |
| 2009/0221298 A1 | 9/2009 | Hanner |
| 2010/0031306 A1* | 2/2010 | Pandey ............. H04N 7/17318 725/131 |
| 2010/0066904 A1 | 3/2010 | Schindler et al. |
| 2010/0153885 A1 | 6/2010 | Yates |
| 2010/0289644 A1* | 11/2010 | Slavin ................ G08B 13/2402 340/568.1 |
| 2011/0016492 A1* | 1/2011 | Morita ............... H04N 5/44543 725/58 |
| 2011/0069940 A1* | 3/2011 | Shimy .................. G11B 27/105 386/296 |
| 2011/0154385 A1* | 6/2011 | Price ..................... H04H 60/45 725/12 |
| 2011/0183603 A1 | 7/2011 | Malik |
| 2012/0026837 A1 | 2/2012 | Li et al. |
| 2012/0057580 A1 | 3/2012 | Hansen et al. |
| 2012/0066626 A1 | 3/2012 | Geleijnse et al. |
| 2012/0151529 A1 | 6/2012 | Andersson |
| 2012/0311635 A1 | 12/2012 | Mushkatblat |
| 2013/0027613 A1 | 1/2013 | Kim et al. |
| 2013/0185368 A1* | 7/2013 | Nordstrom .............. H04W 4/21 709/206 |
| 2013/0304789 A1 | 11/2013 | Herlein |
| 2014/0075575 A1* | 3/2014 | Kim .................. G06Q 30/0251 726/29 |
| 2014/0249927 A1 | 9/2014 | De Angelo |
| 2015/0121406 A1 | 4/2015 | Chai et al. |
| 2015/0189475 A1* | 7/2015 | Schillings ............. H04W 4/026 455/456.1 |
| 2015/0193433 A1* | 7/2015 | Dykeman ............... G06F 16/43 707/722 |
| 2016/0112760 A1* | 4/2016 | Kosseifi ........... H04N 21/42203 725/28 |
| 2016/0127874 A1* | 5/2016 | Kingsmill ............... H04W 4/80 455/456.1 |
| 2017/0030999 A1 | 2/2017 | Garner et al. |
| 2017/0034559 A1 | 2/2017 | Garner et al. |

OTHER PUBLICATIONS

International Search Report and Written Opinion of the International Searching Authority for International Application No. PCT/US2016/043879, dated Oct. 20, 2016 (11 pages).
International Search Report and Written Opinion of the International Searching Authority for International Application No. PCT/US2016/044054, dated Oct. 21, 2016 (11 pages).
Non-Final Office Action dated Aug. 16, 2016 in U.S. Appl. No. 14/813,703 (22 pages).
Final Office Action dated Sep. 30, 2016 in U.S. Appl. No. 14/813,703 (26 pages).
Non-Final Office Action dated Aug. 23, 2017 in U.S. Appl. No. 14/813,703 (35 pages).
Final Office Action dated Jan. 8, 2018 in U.S. Appl. No. 14/813,703 (34 pages).
Non-Final Office Action dated Jan. 9, 2018 in U.S. Appl. No. 14/813,766 (12 pages).

* cited by examiner

DETECTION OF A MOBILE DEVICE TO IDENTIFY USER PREFERENCES AND PROVIDE CUSTOMIZED FUNCTIONALITY OR CONTENT

CROSS REFERENCE TO OTHER APPLICATIONS

This application is a continuation-in-part of application Ser. No. 14/813,703 filed Jul. 30, 2015, which is hereby incorporated by reference in its entirety.

BACKGROUND

Field

This disclosure is generally directed to the detection of a mobile device to identify user preferences and provide customized functionality and/or content.

Background

Different users have different preferences when it comes to the types of television or other media/entertainment they view. However, with standard cable and satellite boxes there is no way to customize the viewing preferences on a per-user basis. Instead, each viewer has the same viewing experience, regardless of their individual viewing preferences.

SUMMARY

Provided herein are system, apparatus, article of manufacture, method and/or computer program product embodiments, and/or combinations and sub-combinations thereof, for the detection of a mobile device to identify user preferences.

An embodiment includes a computer implemented method for detecting a mobile device to identify user preferences. The method may operate by detecting that a mobile device is within a vicinity of a computing device. A user ID that corresponds to the mobile device is identified. A user ID that corresponds to the mobile device is identified. The user ID is provided to an application over a network, wherein the application identifies one or more preferences associated with the user ID. The one or more identified preferences are received from the application. The computing device is configured based on the one or more identified preferences associated with on the user ID, responsive to the detection.

Additional embodiments include a system and a tangible computer-readable device having instructions stored thereon that, when executed by at least one computing device, causes the at least one computing device to perform operations substantially similar to the computer implemented method.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for detecting a mobile device to identify user preferences and provide customized functionality or content.

Figure 1:
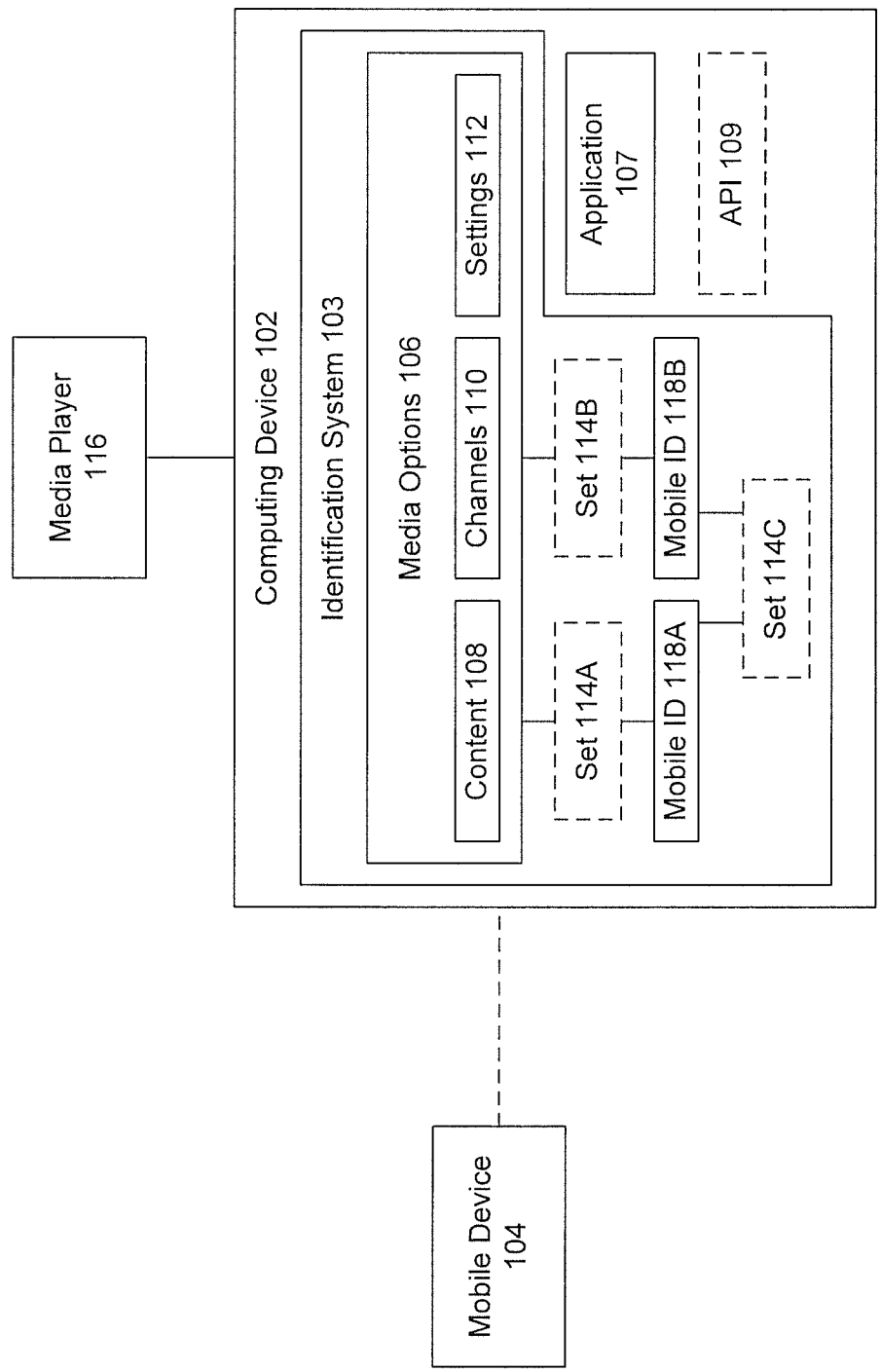
FIG. 1 is a block diagram of a system for detecting a mobile device to identify user preferences and provide customized functionality or content, according to an embodiment.

FIG. 1 is a block diagram of a system 100 for detecting a mobile device to identify user preferences and provide customized functionality or content, according to an embodiment.

Identification system 103 may detect the presence of a mobile device 104 and enable or disable media options 106 associated with a mobile ID 118 (or user ID) corresponding to the detected mobile device 104. Media options 106 may include any preferences, settings, usage history, or other options associated with the use of computing device 102, media player 116, or application 107. For example, a user associated with a first mobile ID 118A may prefer that computing device 102 have an increased brightness setting, or increased sound relative to the media options 106 of user corresponding to a second mobile ID 118B. Then for example, when the first mobile ID 118A is detected, the user's preferences may be loaded. Or, for example, application 107 may provide recommendations for multimedia (e.g., television shows, movies, music, books, websites, etc.) or adjusting media consumption options based on which mobile ID(s) 118 are detected to be within a vicinity of computing device 102.

Identification system 103 may detect the presence of a mobile device 104 and enable or disable media options 106 corresponding to preferences or configurations associated the detected mobile device 104 (or a mobile ID 118 corresponding thereto). Media options 106 may include customized content 108, channels 110, or other settings 112 (including usage history) for a user, user ID, or mobile ID 118 to whom mobile device 104 is registered. When the mobile device 104 is detected to be within a vicinity of computing device 102, the media options 106 corresponding to the user or user ID associated with the detected mobile device 104 are loaded by identification system 103 or one or more applications 107.

In an embodiment, identification system 103 may enable a parent (e.g., or other administrator) to configure computing device 102 to enable/disable content 108 that may be viewed by a child (e.g., or other user). For example, the child may have a mobile device 104 (e.g., laptop, mobile phone, remote control, etc.) registered with identification system 103 or otherwise communicatively coupled (wired or wirelessly) to computing device 102. The parent may then configure media options 106 to disable certain channels 110 (or perform another action) when the child's media device 104 is detected to be within a vicinity of computing device 102.

For example, disabled channels 110 or content 108 may not be viewable via an online channel guide, or may not be selectable for viewing or recording via computing device 102, or may require a passcode for viewing, when the child's media device 104 is detected to be within a vicinity of computing device 102. Additional media options 106 may include setting computing device 102 to provide a visual or audio warning, pause, blur, or mute the content 108 being consumed, or automatically change the channel 110 or content 108 that is being accessed, when the child's media device 104 is detected to be within a vicinity of computing device 102. Other media options 106 may be configured to cause identification system 103 to perform specified action(s) when the child's media device 104 is detected to be within a vicinity of computing device 102. Such actions may include sending an e-mail or text message to the parent based upon a detection of the child's mobile device 104 to be within a vicinity of computing device 102. This may, for example, allow identification system 103 to inform the parent as to the child's whereabouts or location. Other actions may be specified by the parent. For example, the parent may specify that when the child's media device 104 is detected to be within a vicinity of computing device 102, the doors of the house are locked and/or the alarm system is enabled, for security purposes. Such functionality is achieved via communication between the identification system 103 and other control systems in the house.

Identification system 103 may be set or configured to perform any different number of actions if mobile devices 104 for two or more different users with different media options 106 or restrictions are detected to be within a vicinity of computing device 102. As noted, if channel 110 being viewed is an adult-only channel and is on the disabled list of channels 110 for a child (or other restricted user), upon detection of a mobile device 104 associated with a child, the channel 110 may be changed to another channel 110 that is enabled for both an adult set 114A and a child set 114B.

Sets 114 may include different groupings of preferences or media options 106. Sets 114 may be used to customize the viewing, listening, and/or operating experience for one or more users (e.g., corresponding to user or mobile IDs 118) of computing device 102 (including one or more applications 107). A set 114 may include media options 106 associated with or correspond to one or more mobile IDs 118. For example, a parent who has young children with mobile devices 104, may set up a child-only set 114 and register each child's mobile device 104/mobile ID 118 with the set 114. Then, for example, if any of the registered child mobile IDs 118 are identified as being within a particular vicinity (e.g., which may vary by mobile ID 118) of media device 102, the (corresponding) child-only set 114 may be activated on media device 102. Each child may be associated with its own unique set 114, or all children may share a set 114. In an embodiment, a configured set 114 may be used as the default set when no mobile devices 104 are detected or upon system start up. In an embodiment, the default set 114 may include media options 106 that are accessible by all users or mobile IDs 118.

When multiple mobile IDs 118 are detected to be active (e.g., corresponding mobile devices 104 are within a vicinity of computing device 102), identification system may load or identify media options 106 corresponding to a union, intersection, or any other combination of media options 106 or sets 114. For example, mobile ID 118A may have priority over mobile ID 118B, and as such if both mobile IDs 118A and 118B are active, the set 114A corresponding to the higher priority (or a portion of the media options 106 of the higher priority mobile ID 118A) may be set or configured by computing device 102 or application 107. In an embodiment, which sets 114 or media options 106 are chosen may vary by time of day or day of week, etc.

In another embodiment, a particular user with a registered mobile device 104 may have a preference towards sports. Then, for example, when the mobile device 104 for the user is detected within a vicinity of computing device 102, the channel guide (e.g., settings 112) may first show sports channels or those sports channels of greatest interest to the user as may be configured via media options 106 (which may include usage history or content 108 preference options). Or, for example, media device 102 may alert the user on mobile device 104 and/or on media player 116 as to which sports games are currently viewable or available to the user.

Depending on which mobile device(s) 104 are detected within a vicinity of media device 102, media device 102 may enable, disable, or otherwise activate, deactivate, or configure different content 108, channels 110, and other settings or configurations 112 on computing device 102 and/or application 107, referred to herein as media options 106. Media options 106, as used herein, may refer to any individual media option 106 (e.g., content 108, channels 110, settings 112), subset of media options, or the collective group of media options available to or otherwise configurable by a user as default options or across one or more sets 114.

Media options 106 may also apply to one or more applications 107. Application 107 may be a multimedia or streaming application or a website that streams or otherwise provides or makes available multimedia (e.g., television shows, movies, music, books, etc.) or other content 108 to computing device 102. Each mobile ID 118 or group of mobile IDs 118 may have its own preferred content or history of consumed content on an application 107 stored as a set 114. For example, when two or more mobile IDs 118 are detected within a vicinity of computing device 102, a separate set 114 of options (including usage history) may be stored for the combination of two or more mobile IDs 118.

In an embodiment, mobile ID 118 may correspond to a user ID and/or password stored by application 107 (including cloud or server storage associated with application 107). Then, for example, when one or more mobile devices 104 are detected within a vicinity of computing device 102, identification system 103 may provide the corresponding user ID(s) or mobile ID(s) 118 associated with the detected mobile device(s) 104 to application 107. If application 107 is active, then the channel guide, streaming content, or recommended content may change according to the set 114 associated with the user ID(s) (e.g., mobile ID(s) 118). Or, for example, if application 107 is later launched or visited, then application 107 may load media options 106 corresponding to the detected mobile ID(s) 118.

As used herein, mobile ID 118 may be used interchangeably with user ID and users. In an embodiment, each mobile device 104 may correspond to a separate user ID on identification system 103 or across one or more applications 107. Or, for example, mobile ID 118 may be used as a user ID.

Though media options 106 are shown within identification system 103, in an embodiment, different applications 107 may have their own unique media options 106 or other preference settings or restrictions. Then, for example, identification system 103 may pass mobile ID 118 corresponding to a mobile device 104 to an application 107. Application 107 may then load or operate based on the media options 106 corresponding to the identified mobile ID 118. In an embodiment, identification system 103 may activate media options 106 for both computing device 102 and across multiple applications 107 upon the detection of a mobile ID 118.

In an embodiment, application 107 (including applications that are used to configure computing device 102 or media player 116) may communicate with identification system 103 using an application programming interface (API) 109. API 109 may allow for the request, retrieval, access, sharing of information, or back and for communication between identification system 103 and one or more applications 107. API 109 may include, for example, functions that allow identification system 103 and applications 107 to communicate with one another, and request or retrieve information, and/or implement commands. Based on the received mobile ID 118, application 107 may customize its data feed, content, or functionality according to which mobile ID 118 has been detected within a vicinity of computing device 102.

In an embodiment, identification system 103 may use API 109 to communicate with and/or command computing device 102 or media player 116. This may allow identification system 103 to provide or configure computing device 102 or media player 116 based media options 106. For example, API 109 may allow identification system 103 to change the hue, brightness, or volume settings of a television or monitor based on the media options 106 corresponding to a detected mobile ID 118.

Other features of computing device 102 and/or media player 116 (as well as other home theater and/or multimedia components) may also be customized depending on detection or location of a registered mobile device 104. These features include but are not limited to volume level, closed captioning, audio mode, video mode, and/or any other feature or characteristic of media players 116, computing devices 102, and/or other home theater and multimedia components.

In an embodiment, identification system 103 may detect a location of mobile device 104 relative to computing device 102. Based on a particular location of mobile device 104 relative to computing device 102, identification system 103 may load different media options 106 or communicate how media options 106 should be adjusted based on the relative location of a user or mobile device 104. For example, if mobile device 104 exceeds a particular distance, then content 108 being displayed or played may be automatically paused. Or, for example, if mobile device 104 is detected to be to the left of computing device 102, then the audio from speakers may be configured to optimize the sound preferences based on the relative location of mobile device 104 relative to computing device 102.

Media player 116 may be a device configured to receive data and process or otherwise output the data via media device 102. Media player 116 may include a television, monitor, tablet, computer, radio, speakers, or other media input and/or output device that is configured to output video, audio, and/or other media.

Computing device 102 may be any device configured to receive data over a communication network that may be output via a media player 116. Computing device 102 may be or include functionality associated with a satellite box, cable box, media server device, streaming device, DVD, DVR, modem, or other box or device connected to a network or other service (e.g., satellite, cable, over the air, or Internet) that receives data to be stored, buffered, and/or output via media player 116. In an embodiment, media player 116 and computing device 102 may be a single device (such as a television) or multiple devices that communicate via a wired or wireless connection (such as a television coupled to a satellite box, cable box, media server device, streaming device, DVD, DVR, modem, or media device(s)).

In an embodiment, computing device 102 may include or otherwise be connected to a tuner. A tuner may receive media, such as television, radio, or other content 108 transmit from one or more network services or content providers. For example, the tuner may be a wide-band or narrow-band television tuner that converts television transmissions (e.g., radio frequency analog, or digital transmissions) into audio and/or video signals, which can be used to produce sound and pictures on a subscriber's television, computer, or other media player 116. The tuner may receive packets of data via a satellite, cable, or other communication system (including over the air or the Internet). In other embodiments, the tuner may receive different types of media, including but not limited to video and/or sound.

In an embodiment, the tuner of computing device 102 may receive data or other content 108 received over one or more channels 110. Channels 110 may be television, radio, or other streaming/static service channels that provide particular content 108 that is associated with or provided by that channel 110. In an embodiment, different channels 110 may provide varying types of content 108, directed to different subjects or interest areas. Example channels 110 may include sports channels, adult-only channels, children directed channels, cartoon channels, local sports channels, pay-per-view channels, team specific sports channels, news channels, channels that are provided based on a geographic location of computing device 102, cooking channels, history channels, nature channels, movie channels, or other channels. The channels media option 110 could be set to enable/disable particular channels 110, or general categories of channels (e.g., sports-only, cartoon-only, family-friendly, nature, etc.).

Content 108 may include streaming, live, real-time, or previously stored (e.g., on a local memory or on-demand from a broadcast or other service provider) content. Content 108 may include movies, sports, shows, music, or content of any other genre or type. Content 108 may include audio, video, and/or other multimedia that may be received by computing device 102. The content media option 108 could be set to enable/disable particular content by title, genre, actors, ratings, reviews, release year, recently added, or other categories of content.

In an embodiment, channel 110 may refer to a website or webpage being displayed on computing device 102 or media player 116 via an Internet browser or other application 107. Content 108 may include particular content (e.g., images, video, ads, sound, text, or other multimedia) of the corresponding webpage. In an embodiment, viewing preferences or media options 106 may be configured on a per channel 110 and/or per content 108 basis for each user (e.g., mobile ID 118).

Computing device 102 may have a subscription through a service provider (e.g., satellite, cable, or over the air) to receive particular channels 110 and/or content 108. The subscription may indicate from which channels 110 computing device 102 may receive content 108. The subscription may include special authorization to receive particular content 108, such as pay-per-view movies, events, or other media.

The transmissions from the broadcast service (e.g., satellite, cable, over the air, or Internet company) may be broadcast, multicast, simulcast, or unicast transmissions. In an embodiment, a tuner in computing device 102 may receive the content 108, channels 110, and/or other data (e.g., such as subscription information, channel guide, etc.) from the broadcast service for display on media player 116.

In an embodiment, computing device 102 may include, without limitation, a cable box, DVD player, satellite receiver, modem, mobile phone, or computer. These boxes may include communication ports, memories, processors or other conventional computer components, including a wired and/or wireless communication with other devices (including other computing devices 102 or mobile device 104). For example, a broadcast or streaming service may provide content 108 or provide access to one or more channels 110 via an application installed or a device (e.g., computer or mobile phone), or via a website that is accessible over the Internet or other network.

The memories of computing device 102 may include local memory and/or network-accessible memory (e.g., such as cloud storage). The memory may be used to store received content 108, settings 112, subscription information (e.g., channels or pay-per-view purchases), and sets 114. The memory may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., USB memory, solid state drives SSD, etc.), and/or any other type of storage media configured for storing information.

Media options 106 of computing device 102 may be configured based on a per-user, per-mobile device 104, or per-group of mobile devices 104 basis. For example, a mobile device 104 may be registered with or otherwise communicatively coupled to computing device 102 and may be assigned or associated with a mobile ID 118. The mobile ID 118 may be a telephone number, MAC (media access control) address, IP (internet protocol) address, username, serial number, or other unique identifier that corresponds to a particular mobile device 104. In an embodiment, mobile ID 118 may correspond to one or more user IDs (different from the mobile ID 118).

Mobile ID 118 may be configured in or otherwise associated with a configured set of media options 106, the configured set of media options being referred to as set 114. Set 114 may include configured content 108, channels 110, and/or settings 112. Then, for example, if/when computing device 102 detects the presence of a mobile device 104 associated with a mobile ID 118, computing device 102 may activate or otherwise be configured with the corresponding set 114 of media options 106. Activating set 114 may change or otherwise adjust the viewing experience of the user(s) viewing or hearing content 108 from computing device 102, or otherwise interacting with or operating computing device 102.

Figure 3:
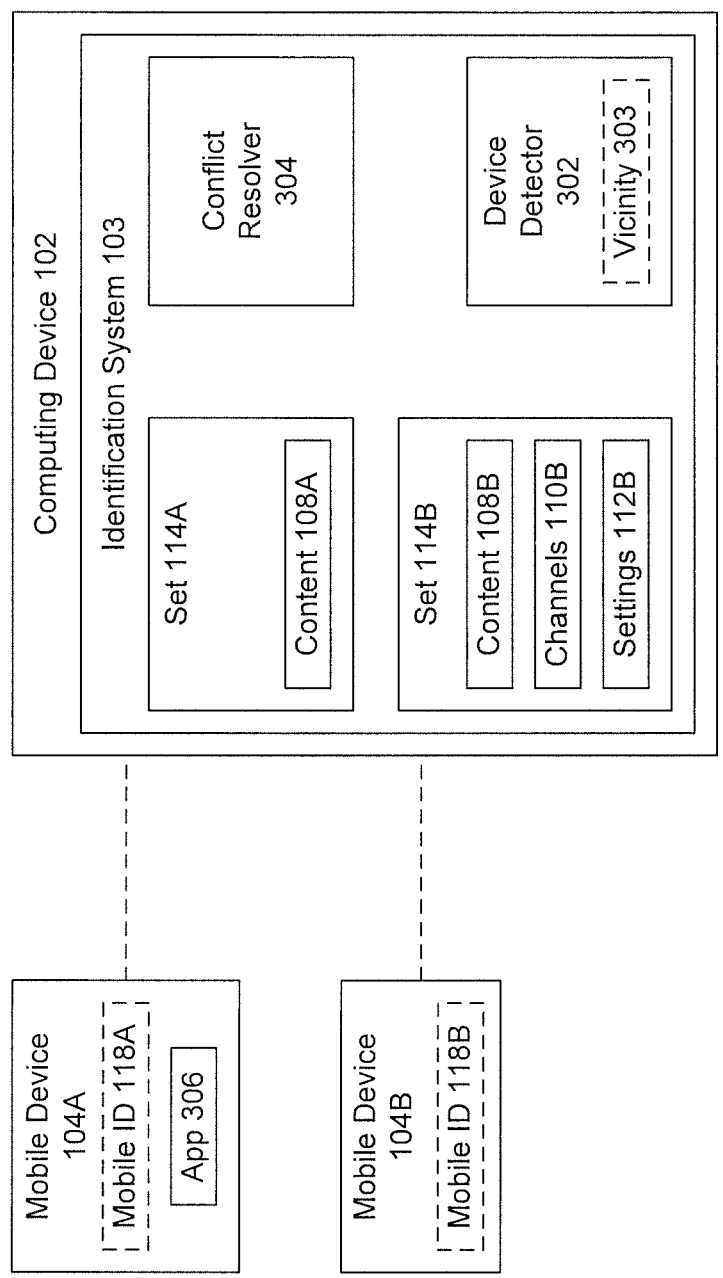
FIG. 3 is a block diagram of a system for detecting a mobile device to identify user preferences and provide customized functionality or content, according to another embodiment.

A device detector 302 (as shown in FIG. 3) of identification system 103 or otherwise communicatively coupled with computing device 102 may determine which mobile device(s) 104 are within a particular vicinity 303 of computing device 102 by any number of methods. For example, vicinity 303 may be determined by detecting a peer-to-peer, or other direct or indirect, connection between mobile device 104 and computing device 102. The device detector 302 may detect and communicate with mobile device(s) via Bluetooth, NFC (near field communication) technology, cellular, WIFI and/or other communication mediums and technologies.

Figure 5:
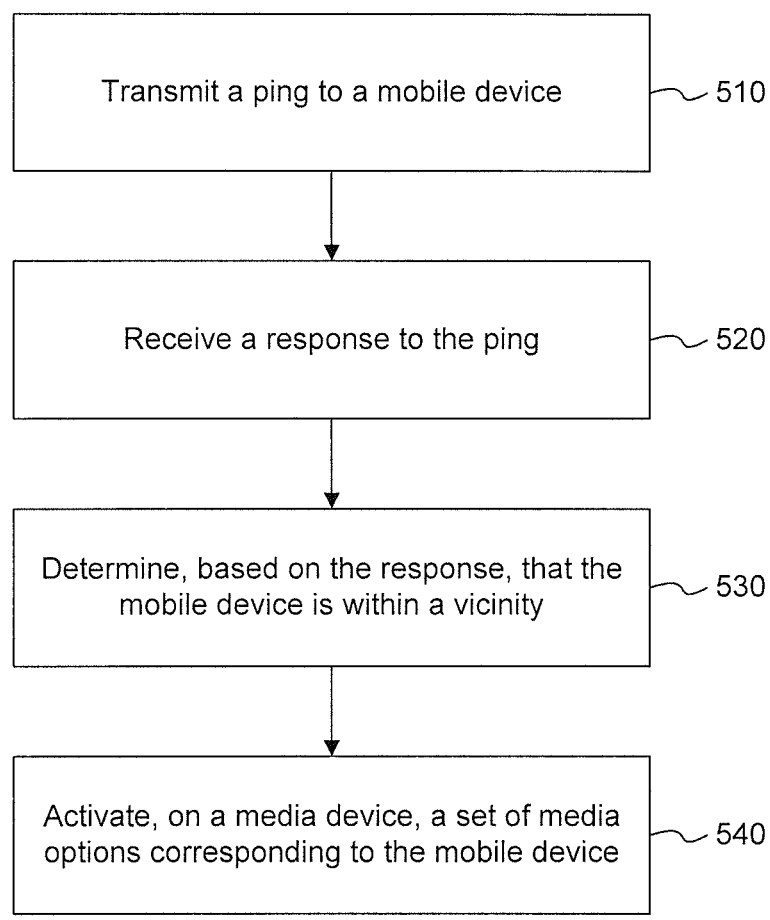
FIG. 5 is a flowchart for a method for detecting a mobile device to identify user preferences and provide customized functionality or content, according to another embodiment.

For example, using any of these technologies, device detector 302 may issue an electronic ping. FIG. 5 is a flowchart for a method for detecting a mobile device to identify user preferences and provide customized functionality or content, according to another embodiment.

In step 510, a ping may transmit to a mobile device. For example, device detector 302 may transmit an electronic ping to a mobile device 104A. The ping may an audible ping that is received by a microphone on mobile device 104A, or a ping transmit via app 306. In an embodiment, this ping could be issued via a text message to a specified address over a cellular connection.

In step 520, a response to the ping may be received. For example, mobile device 104A may receive the ping and transmit a response using an audio tone, text message, or other another message using app 306. In an embodiment, the ping may be a broadcast or general ping, and any mobile device 104A or 104B receiving such ping would respond.

In step 530, it is determined, based on the response, that mobile device is within a vicinity of the computing device. For example, device detector 302 may receive the ping from mobile device 104A. The response may include information necessary to determine a location of mobile device 104A, including whether device 104A is within vicinity 303. In an embodiment, the response may include mobile ID 118 of the responding mobile device 104.

In step 540, a set of media options is activated on the computing device corresponding to the responding mobile device. For example, device detector 302 may detect that mobile device 104A is within vicinity 303 and activate or otherwise signal set 114 to be activated on computing device 102. In an embodiment, if device detector 302 detected the presence of both mobile devices 104A and 104b to be within vicinity 303, the conflict between sets 114A and 114B may be resolved by conflict resolver 304 as described herein.

Returning to FIG. 3, alternatively or in additionally, an audio redetermination may be used by device detector 302. In audio determination, an audible tone may be sent from computing device 102 to mobile device 104 that is received by a microphone in mobile device 104. Based on the time between the transmission and receipt, identification system 103 may determine a distance between computing device 102 and mobile device 104. In an embodiment, mobile device 104 may send a sound or ping back to computing device 102 to determine vicinity 303.

In an embodiment, vicinity 303 or distance between mobile device 104 and computing device 102 may be determined based on a signal strength of mobile device 104 if both computing device 102 and mobile device 104 are connected to the same wireless (e.g., Wi-Fi) network. In another network embodiment, computing device 102 may determine whether mobile device 104 is present on a network, and its presence may indicate that mobile device 104 is within vicinity 303 of computing device 102. In another embodiment, a global positioning system (GPS) location of mobile device 104 may be detected, and determined whether or not it is within a predefined or particular vicinity 303 of computing device 102. An example of this is described in patent application titled "Mobile Device Based Control Device Locator" which is assigned patent application Ser. No. 14/813,766, filed Jul. 30, 2015, which is incorporated by reference herein in its entirety.

Example settings for vicinity 303 may include being within the same room, being within a specified distance (e.g., meters or feet), or being on the same network as computing device 102. In an embodiment, the vicinity 303 necessary for activation of a set 114 may vary by mobile ID 118, mobile device 104, and/or set 114. For example, of two mobile devices 104A and 104B that are determined to be the same distance from computing device 102, one may be determined to be within vicinity 303 of computing device 102, and one may not, based on settings 112 of the corresponding sets 114.

Returning to FIG. 1, each set 114 may include a configuration of any media options 106 available to the user. Sets 114 may include the access to, restrictions from, and/or configurations of particular content 108, channels 110, settings 112, and may vary by which mobile device(s) 104 are within a vicinity of computing device 102 and may vary by time of day or day of the week as well. For example, a mobile ID 118 of mobile device 104 may be prevented from watching television or a particular program after 9:00pm. Then, for example, if the mobile ID 118 is detected within the vicinity of computing device 102 after 9:00pm, computing device 102 may shut down, discontinue viewing capabilities, or otherwise provide a warning to the user. Or, for example, set 114 for a mobile device 104 may be restricted from viewing a particular channel 110 during a set period of time.

A conflict resolver 304 (as shown in FIG. 3) determine how to react, respond, or set media options 106 when two or more mobile devices 104 with conflicting sets 114 are detected within vicinity 303. In an embodiment, different mobile IDs 118A and 118B may be assigned priorities. Then, for example, the set 114 corresponding to the mobile ID 118 with the highest priority may be activated by conflict resolver 304. The priorities may vary by time or day of the week. Or, for example, if the mobile ID 118A is associated with an adult and the mobile ID 118B is associated with a child, and both are detected to be within a vicinity 303 of computing device 102, conflict resolver 304 may resolve the conflict.

For example, conflict resolver 304 may activate the adult viewing set 114A, activate the child viewing set 114B, activate a different set 114 defined for such a conflict. In an embodiment, a union or intersection of two or more sets 114A and 114B may be activated. Or, for example, the mobile device 104A may be prompted for a decision on which set 114 to activate.

Returning to FIG. 1, in an embodiment, a visual display (as may be shown on media player 116 and/or computing device 102) associated with computing device 102 may indicate which set 114 is activated. For example, each set may be named and/or be associated with a particular color or color combination on a menu system of computing device 102 or a light on computing device 102 may change colors. Then, for example, a viewer could determine which set 114 is activated.

Media options 106 may include sound options too, for example customized settings of a sound system associated with or connected to computing device 102. Then, for example, based on the detection of a particular mobile device 104, the sound options (e.g., volume, bass, or other settings) may be adjusted to the preferences set by that user. If media player 116 is communicatively coupled to computing device 102, then viewing options on media player 116 may be adjusted in media options 106 as well. For example, hue, color, contrast, brightness, or other options may automatically be adjusted upon the activation of different sets 114.

In an embodiment, computing device 102 may be configured to only allow an adjustment of one or more of the sets 114 if a particular administrator or master mobile device 104 is detected. In another embodiment, the presence of a particular mobile device 104 may be enabled to adjust settings 112 and/or further restrict content 108/channels 112 to be viewed within the set 114, but may not be allowed to add new channels 112/content 108 not previously authorized (e.g., without a presence of a master or administrator mobile device 104).

Figure 2:
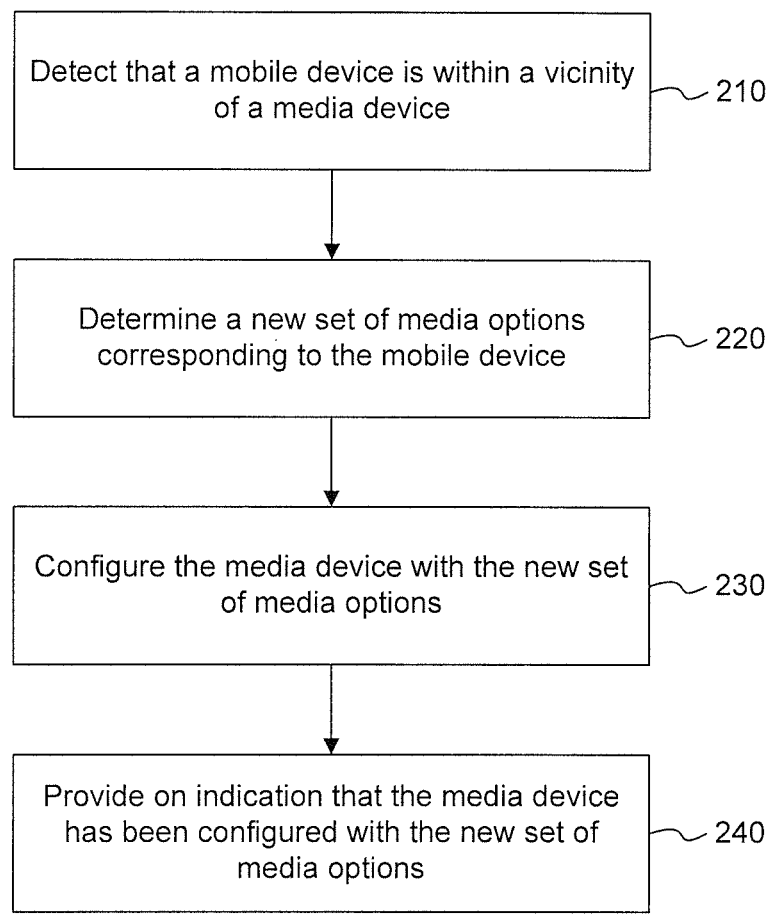
FIG. 2 is a flowchart for a method for detecting a mobile device to identify user preferences and provide customized functionality or content, according to an embodiment.

FIG. 2 is a flowchart for a method 200 for detecting a mobile device to identify user preferences and provide customized functionality or content, according to an embodiment. Method 200 can be performed by processing logic that can comprise hardware (e.g., circuitry, dedicated logic, programmable logic, microcode, etc.), software (e.g., instructions running on a processing device), or a combination thereof.

In step 210, a mobile device is detected within a vicinity of a media device. For example, computing device 102 may determine that mobile device 104 is within a vicinity 303 of computing device 102. As noted above, computing device 102 may be a media device (e.g., used to receive or play multimedia). The determination may be made, for example, based upon a presence of mobile device 104 on a network or through direct/indirect communication with mobile device 104. If no mobile device 104 is detected within vicinity 303 of computing device 102, identification system 103 may activate a default set 114 of options.

In step 220, a different set of media options corresponding to the mobile device are determined. For example, the detected mobile device 104 may correspond to a mobile ID 118 that is associated with or corresponds to a set 114 of media options 116. The set 114 may enable/restrict content 108 and/or channels viewable to a user associated with the detected mobile device 104 based on age or other restrictions. For example, channel or content ratings that may be accessible may be used to set restrictions for a set 114. If multiple devices 104 with different sets 114 are detected, computing device 102 may prompt the users as to which set 114 is to be activated, may resume operation with the current 114, or perform another preconfigured set-conflict activity.

In step 230, the media device is configured with the different set of media options. For example, based on the set-conflict activity, or the detection of a registered mobile device 104, identification system 103 may activate the correspond set 114.

In step 240, an indication that the media device has been configured with the new set of media options is provided. For example, identification system 103 may notify or signal the user that a different set 114 has been activated. Or, for example, computing device 102 (or an application 107 operating thereon) may change the channel 110, restrict content 108, power off, or perform another activity corresponding to the media options 106 configured for the set 114.

FIG. 3 is a block diagram of a system 300 for detecting a mobile device to identify user preferences and provide customized functionality or content, according to another example embodiment.

As discussed above, identification system 103 may include a conflict resolver 304 and device detector 302. The device detector 302 may determine which device(s) 104 are within a vicinity 303 of computing device 102. And if multiple devices 104A and 104B are detected within vicinity 303, then conflict resolver 304 may determine which media options 106 to activate or how to resolve the conflict.

In an embodiment, upon a detection of mobile device 104B, conflict resolver 304 may determine that the newly detected mobile device 104B is not authorized or enabled to view a currently selected channel 110B. Then, for example, conflict resolver 304 may signal computing device 102 on how to respond to the conflict. Example responses include, but are not limited to, pausing/buffering the current channel 110 and informing the users of the conflict, recording the current channel 110 and changing the channel, or performing any other actions.

In the example shown, set 114B may have configurations for content 108B, channels 110B, and settings 112B. Set 114A however may only have configurations for content 108A. In such a scenario, if there is no conflict, channels 110B and settings 112B from set 114B. Conflict resolver 304 may then resolve any conflicts that exist between content 108A and content 108B.

In an embodiment, mobile devices 104 may communicate with computing device 102 (and vice versa) through an app 306. App 306 may be an application or program installed on or accessible by (e.g., over the Internet) mobile devices 104. Through communication via app 306, mobile device 104 may change channels, adjust sets 114, or perform other operations on computing device 102. In an embodiment, device detector 302 may communicate with or detect the presence of mobile device 104 via app 306. For example, app 306 may communicate its associated mobile ID 118 to identification system 103 as discussed above. In an embodiment, app 306 may include or be an application 107 (from FIG. 1), and the terms may be used interchangeably, or may be specially configured to communicate with identification system 103.

Figure 6:
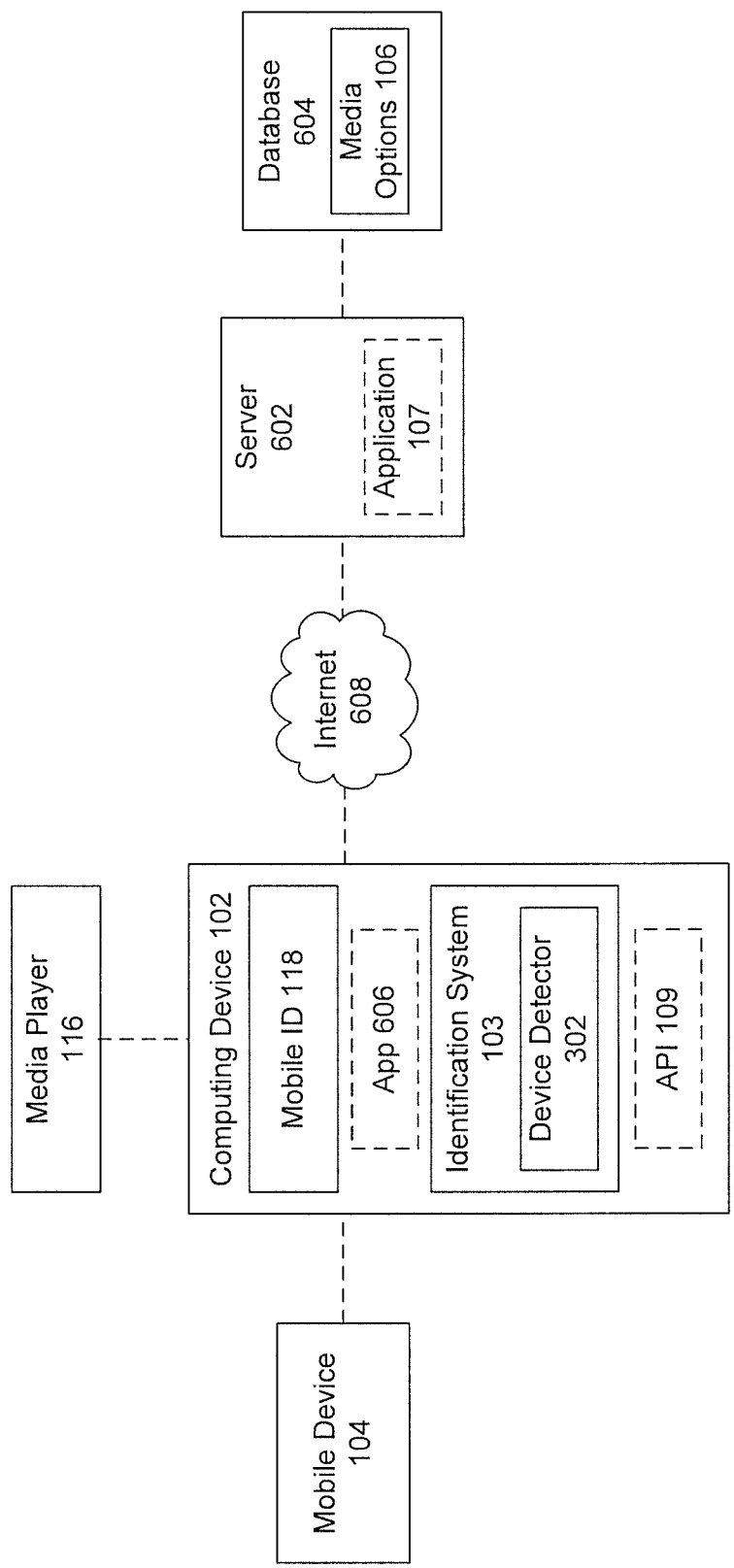
FIG. 6 is a block diagram of a system for detecting a mobile device to identify user preferences and provide customized functionality or content, according to another embodiment.

FIG. 6 is a block diagram of a system 600 for detecting a mobile device to identify user preferences and provide customized functionality or content, according to another embodiment. In the example of FIG. 6, identification system 103 may identify or detect that mobile device 104 is nearby media player 116 and/or computer device 102 (which may be a single device or multiple devices). Identification system 103 may then determine a mobile or user ID 118 associated with the mobile device 104.

The identified mobile ID 118 may then be provided to a server 602 via the Internet 608. Internet 608 may be any wired or wireless network communication channel or medium. Server 602 may be a web server, cloud, content provider or other computing device(s) that provides data to computing device 102. In an embodiment, computing device 102 may have an app 606 corresponding to application 107. App 606 may be a portion of or interface to functionality provided by application 107. For example, app 606 may include a selectable graphical icon that allows a user to login to application 107. Then, for example, content or functionality of application 107 may be accessible by or provided to a user via app 606.

In an embodiment, application 107 may include functionality that cannot be or is not stored on computing device 102, but instead is hosted by server 602. For example, server 602 may include a data store of content that is provided to computing device 102 via app 606. Then, for example, when a user selects an option or functionality via app 606, app 606 may communicate with application 107 on server 602 via a communications network such as the Internet and retrieve data corresponding to the functionality. As used herein, app 606 and application 107 may be used interchangeably to refer to functionality and/or content or other data provided by application 107.

In an embodiment, server 602 may communicate with or command (or otherwise interact with) computing device 102 and/or media player 116 via app 606 and/or API 109. API 109 may, for example, allow application 107 on server 602 to communicate with identification system 103 and retrieve or receive information such as mobile ID 118. API 109 may also allow application 107 to direct computing device 102 or media player 116 to perform certain functions such as increase a volume level, turn off, or communicate with another system, device, or server.

In an embodiment, server 602 may be communicatively coupled to a database 604. Database 604 may be any computing device(s) or data store used to store and provide data to server 602 for use by application 107. Database 604 may, for example, store content/data, media options 106 (including usage history), billing data, or other data that may be used in conjunction with the operation of application 107. Though not specifically shown, it is understood that any of the system 100 of FIG. 1 or system 300 of FIG. 3, may include backend or cloud functionality as shown in FIG. 6 (e.g., as provided by one or more servers 602 and/or database 604).

Figure 7:
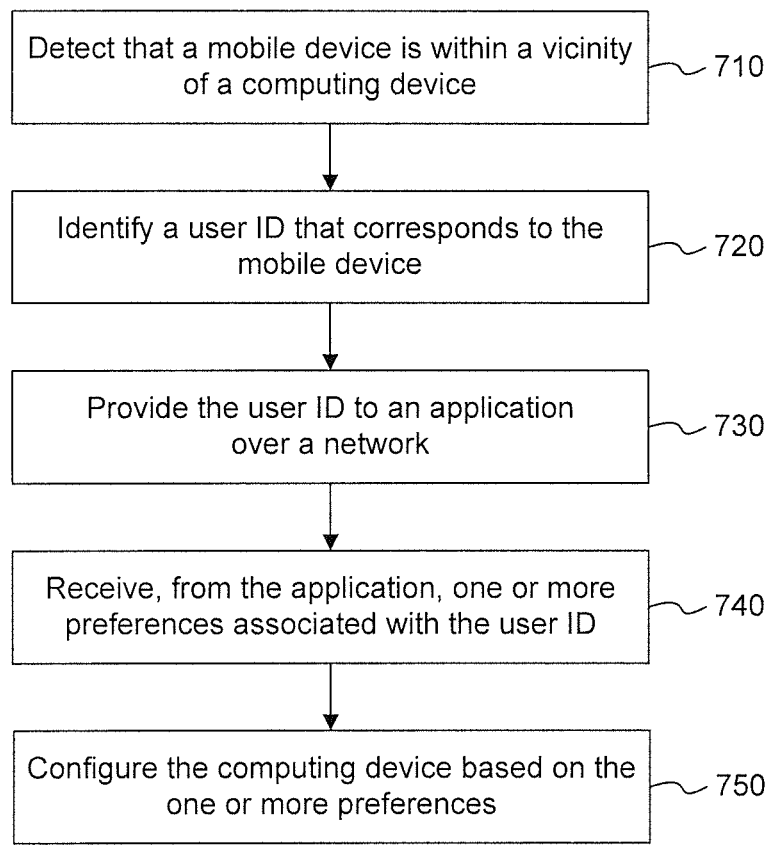
FIG. 7 is a flowchart for a method for detecting a mobile device to identify user preferences and provide customized functionality or content, according to another embodiment.

FIG. 7 is a flowchart for a method 700 for detecting a mobile device to identify user preferences and provide customized functionality or content, according to another embodiment.

In step 710, a mobile device is detected within a vicinity of a computing device. For example, as shown in FIG. 6, device detector 302 may detect that one or more mobile devices 104 are within a vicinity 303 of computing device 102 and/or media player 116. Vicinity 303 may be any distance or proximity indicator and may vary amongst different devices communicatively coupled to computing device 102.

In step 720, a user ID that corresponds to the mobile device is identified. For example, identification system 103 may identify a mobile ID 118 corresponding to each mobile device 104. In an embodiment, a user may be prompted to confirm the mobile ID 118 selection or activation prior to continuing.

In step 730, the user ID is provided to an application over a network. For example, identification system 103 may provide the mobile ID 118 or corresponding user ID(s) to an application 107 over Internet 608. In an embodiment, application 107 may request mobile ID 118 or other information via API 109. Or, for example, identification system 103 may provide mobile ID 118 to any apps 606 that are active on computing device 102. App 606 may then communicate this and other information to application 107 over Internet 608.

In step 740, one or more preferences associated with the user ID are received from the application. For example, upon receipt of mobile ID 118, server 602 (including application 107) may communicate with database 604 to determine preferences, functions, or other media options 106 that are to be performed or set. Server 602 may receive or retrieve media options 106 and communicate them back to computing device 102 over Internet 608. Media options 106 may be received by computing device via app 606 and/or API 109.

In step 750, the computing device is configured based on the one or more preferences. For example, using API 109, application 107 may instruct or otherwise cause computing device 102 (or media player 116) to perform an action responsive to the detection of mobile ID 118. Computing device 102 may then execute or perform the command received via API 109. Or, for example, application 107 may communicate with app 606 to cause different content 108 to be displayed or provided via a computing device 102 or media player 116. In an embodiment, an indication that the application has been configured based on mobile ID 118 is provided.

Figure 4:
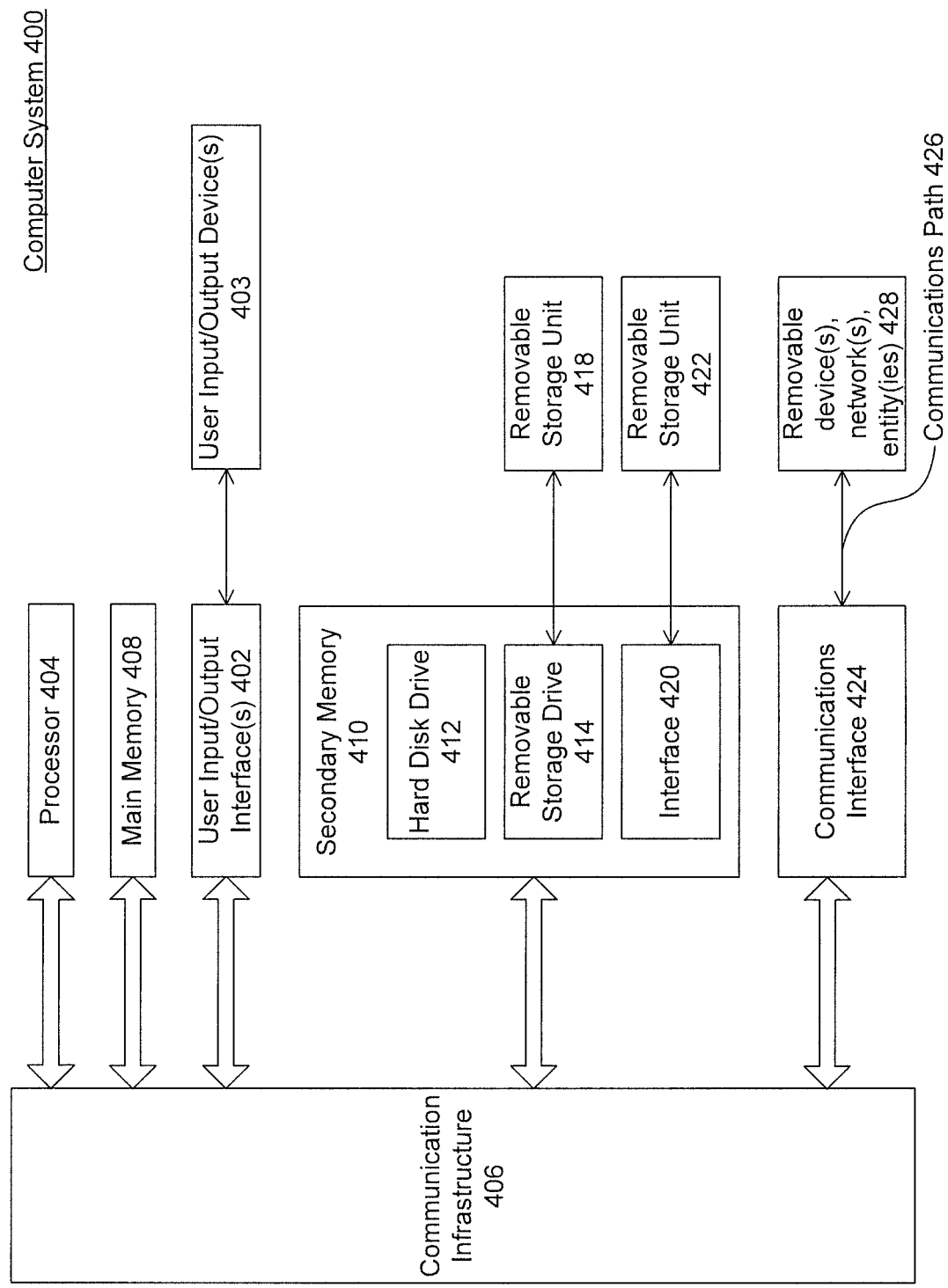
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:
   selecting a default set of media options with which to configure a streaming multimedia device upon system start up, wherein the default set is selected from a first set of media options corresponding to a minor child and second set of media options corresponding to a non-minor user;
   detecting that a first mobile device is within a vicinity of the streaming multimedia device based on an audible ping;
   identifying a first user ID that corresponds to the first mobile device;
   determining that the first user ID corresponds to the minor child;
   transmitting a message to a telephone number of a mobile device associated with the non-minor user indicating a location of the child as being within the vicinity of the multimedia device;
   receiving a request to access particular content from a second user ID from a second mobile device detected to be within the vicinity of the multimedia device, wherein the second user ID corresponds to the non-minor user account, wherein the minor child is prohibited from accessing the particular content;
   requesting a passcode from the second mobile device to access the requested particular content based upon the detecting that the first mobile device associated with the minor child is within the vicinity;
   responsive to receiving the passcode, providing access to the particular content via the multimedia device; and
   outputting the particular content associated with the request, wherein the particular content includes a particular color scheme corresponding to the second set of media options, and wherein a different color scheme corresponds to the first set of media options.

2. The method of claim 1, wherein the detecting, identifying and providing the user ID comprise:
   identifying, by the streaming multimedia device, the first mobile ID of the first mobile device as corresponding the user ID of a user of the first mobile device;
   identifying, by the streaming multimedia device, the second mobile ID of the second mobile device as corresponding the user ID of a user of the second mobile device; and
   providing the first user ID and second user ID to the application, wherein the application identifies the preferences associated with at least one of: the first user ID, the second user ID, or both the first and second user IDs, wherein the streaming multimedia device is configured to receive media content from the application, and wherein the preferences are used to determine which media content is provided to the streaming multimedia device from the application.

3. The method of claim 2, further comprising:
   receiving, from the application, an indication as to which user ID(s) are associated with the one or more identified preferences; and
   wherein the configuring comprises providing a visual or audio notification as to which user ID(s) are associated with the one or more identified preferences.

4. The method of claim 1, wherein the configuring comprises:
   determining a relative location of the first mobile device relative to the streaming multimedia device, wherein the relative location indicates a particular location of the first mobile device within the vicinity and indicates a relative parameter other than the distance;
   adjusting visual display settings of the streaming multimedia device based on the relative location.

5. The method of claim 4, wherein the configuring comprises:
   adjusting audio settings of the streaming multimedia device based on the relative location.

6. The method of claim 4, wherein the determining the relative location comprises:
   receiving a ping from the mobile device; and
   determining, based on the ping, a location of the mobile device in a room relative to the streaming multimedia device, wherein the one or more preferences are adjusted based on the location of the mobile device relative to the streaming multimedia device.

7. The method of claim 6, further comprising:
   determining a subsequent location of the mobile device in the room relative to the streaming multimedia device, wherein the relative location indicates whether the mobile device is located to the left, right, or center of a location of the streaming multimedia device; and
   adjusting the one or more preferences based on the subsequent location of the mobile device.

8. The method of claim 1, further comprising:
   determining that an app associated with the application is active on the streaming multimedia device;
   communicating the user ID to the app, wherein the app is communicatively coupled to the application over the network;
   and wherein the outputting comprises outputting content received from the app appropriate for the minor.

9. The method of claim 1, wherein the transmitting comprises:
   transmitting a request to a security system enable an alarm based on a location of the child.

10. The method of claim 1, wherein further comprising:
    transmitting a general ping; and
    receiving from the mobile device associated with the child a response to the general ping including information that indicates that the location of the child associated with the mobile device is within the vicinity.

11. The method of claim 1, wherein the default set of media options excludes a program accessible in the second set of media options to the non-minor user.

12. The method of claim 1, further comprising:
    receiving, at the streaming multimedia device, a return audible ping from the first mobile device; and
    determining that the first mobile device is within the vicinity based on the return audible ping.

13. A system, comprising:
    a memory; and
    at least one processor coupled to the memory and configured to:
    select a default set of media options with which to configure a streaming multimedia device upon system start up, wherein the default set is selected from a first set of media options corresponding to a minor child and second set of media options corresponding to a non-minor user;
    detect that a first mobile device is within a vicinity of the streaming multimedia device based on an audible ping, wherein the vicinity is a measure of a distance between the first mobile device and the streaming multimedia device;
identify a first user ID that corresponds to the first mobile device;
determine that the first user ID corresponds to the minor child;
transmit a message to a telephone number of a mobile device associated with the non-minor user indicating a location of the child as being within the vicinity of the multimedia device;
receive a request to access particular content from a second user ID from a second mobile device detected to be within the vicinity of the multimedia device, wherein the second user ID corresponds to the non-minor user account, wherein the minor child is prohibited from accessing the particular content;
request a passcode from the second mobile device to access the requested particular content based upon the detecting that the first mobile device associated with the minor child is within the vicinity;
responsive to receiving the passcode, provide access to the particular content via the multimedia device; and
output the particular content associated with the request, wherein the particular content includes a particular color scheme corresponding to the second set of media options, and wherein a different color scheme corresponds to the first set of media options.

14. The system of claim 13, wherein to detect, identify, and provide the user ID, the processor is configured to:
detect that the first mobile device is within the vicinity of the streaming multimedia device, wherein the first mobile device corresponds to a first user ID;
detect that the second mobile device is within the vicinity of the streaming multimedia device, wherein the second mobile device corresponds to a second user ID; and
provide the first user ID and second user ID to the application, wherein the application identifies the preferences associated with at least one of: the first user ID, the second user ID, or both the first and second user IDs, wherein the streaming multimedia device is configured to receive media content from the application, and wherein the preferences are used to determine which media content is provided to the streaming multimedia device from the application.

15. The system of claim 14, wherein the processor is further configured to:
receive, from the application, an indication as to which user ID(s) are associated with the one or more identified preferences; and
wherein the processor that configures the computing device is configured to provide a visual or audio notification as to which user ID(s) are associated with the one or more identified preferences.

16. The system of claim 13, wherein to configure the computing device the processor is configured to:
determine a relative location of the first mobile device relative to the streaming multimedia device, wherein the relative location indicates a particular location of the first mobile device within the vicinity and indicates a relative parameter other than the distance; and
adjust visual display settings of the streaming multimedia device based on the relative location.

17. The system of claim 13, wherein the processor is further configured to:
determine that an app associated with the application is active on the streaming multimedia device; and
communicate the user ID to the app, wherein the app is communicatively coupled to the application over the network.

18. The system of claim 13, wherein to detect the processor is configured to:
determine a location of the second mobile device in a room relative to the streaming multimedia device, wherein the one or more preferences are adjusted based on the location of the second mobile device relative to the first computing device.

19. The system of claim 18, wherein the processor is further configured to:
determine a subsequent location of the mobile device in the room relative to the streaming multimedia device, wherein the relative location indicates whether the mobile device is located to the left, right, or center of a location of the streaming multimedia device; and
adjust the one or more preferences based on the subsequent location of the mobile device.

20. A non-transitory computer-readable device having instructions stored thereon that, when executed by at least one computing device, causes the at least one computing device to perform operations comprising:
selecting a default set of media options with which to configure a streaming multimedia device upon system start up, wherein the default set is selected from a first set of media options corresponding to a minor child and second set of media options corresponding to a non-minor user;
detecting that a first mobile device is within a vicinity of the streaming multimedia device based on an audible ping;
identifying a first user ID that corresponds to the first mobile device;
determining that the first user ID corresponds to the minor child;
transmitting a message to a telephone number of a mobile device associated with the non-minor user indicating a location of the child as being within the vicinity of the multimedia device;
receiving a request to access particular content from a second user ID from a second mobile device detected to be within the vicinity of the multimedia device, wherein the second user ID corresponds to the non-minor user account, wherein the minor child is prohibited from accessing the particular content;
requesting a passcode from the second mobile device to access the requested particular content based upon the detecting that the first mobile device associated with the minor child is within the vicinity;
responsive to receiving the passcode, providing access to the particular content via the multimedia device; and
outputting the particular content associated with the request, wherein the particular content includes a particular color scheme corresponding to the second set of media options, and wherein a different color scheme corresponds to the first set of media options.

* * * * *

UNITED STATES PATENT AND TRADEMARK OFFICE
CERTIFICATE OF CORRECTION

PATENT NO. : 10,820,032 B2  
APPLICATION NO. : 14/958283  
DATED : October 27, 2020  
INVENTOR(S) : Garner et al.

Page 1 of 1

It is certified that error appears in the above-identified patent and that said Letters Patent is hereby corrected as shown below:

On the Title Page

In item (57), replace "with on the user ID" with --with the user ID--.

In the Claims

In Column 15, Lines 46-47, replace "corresponding the user ID" with --corresponding to the user ID--.

In Column 15, Line 52, replace "the first user ID and second user ID" with --the first user ID and the second user ID--.

In Column 16, Line 40, replace "to a security system enable an alarm" with --to a security system to enable an alarm--.

In Column 17, Line 37, replace "the first user ID and second user ID" with --the first user ID and the second user ID--.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*